UNITED STATES PATENT OFFICE 2,529,585

PREVENTION OF MIST ON TRANSPARENT SHEETS AND REFLECTORS

Archibald St. John Austin, Princes Risborough, Reuben Hillel Sapiro, Pinner, and Reginald Percy Fraser, Kingston Hill, England No Drawing. Application January 9, 1946, Serial No. 640,144. In Great Britain January 10, 1945

9 Claims. (Cl. 154—46.8)

This invention relates to the prevention of mist and frost on glass and similar transparent sheet material, and on mirrors and reflectors whether of glass or metal. It is a common experience that visibility through glass and similar transparent sheet material such as sheets of transparent organic condensates becomes reduced by condensation of atmospheric moisture upon the surface of the transparent material as for example the windscreen of a motor car; the disadvantages and even danger due to such a condition, especially on the windows of motor cars and aircraft, is of course obvious, especially when freezing of the condensed moisture occurs and it becomes more difficult to wipe it away. The disadvantage due to misting also occurs in the case of mirrors and reflectors.

It is known to apply to glass, for anti-misting purposes, a transparent flexible cellulosic film made to adhere by means of glue or gelatin in aqueous solution. Also it has been proposed in British patent specifications 564,987 and 564,989 to use a composite adhesive liquid for application to the film which after application of the liquid is then dried and stored ready for use at any subsequent time by merely wetting, as by dipping in water or in a wetting solution, and applying while wet to the glass or like surface. Furthermore British patent specification No. 564,993 describes further ways and means of improving the preparation of the coated flexible film and its application to the glass or similar transparency including organic glass, e. g. methacrylate resin sheets.

The chief object of the present invention is to enable flexible moisture-absorbent transparent anti-misting films for application to glass or other transparent sheet material to be applied more easily than hitherto and without requiring experience or acquired skill.

It will be appreciated that the anti-misting film employed should be optically perfect and, being thin and easily damaged, must, until wanted for application to the glass or like transparency, be packed and stored with an interleaving of other sheet material which will not cause injury or damage and in a manner such that the interleaving does not become displaced. Moreover, in use care must be exercised that the thin anti-misting film is not subjected to folding or creasing the result of which would be to cause blemish that can only be removed during application by the use of acquired skill and knowledge. Further, in order to obtain clearly cut edges, considerable care must be exercised, owing to the flimsy nature of the film, when a piece of the required shape and size is cut from a larger piece.

A further disadvantage from the point of view of the user of anti-misting film alone is that for best results it is essential to wet the film in an open pan or dish having a sufficiently large area to allow immersion in a wetting liquid in the pan or dish without folding or crumpling of the film and thereby avoiding blemish. This usually involves additional expense and thereby constitutes a disadvantage.

According to the present invention the above mentioned disadvantages are overcome by mounting anti-misting film on a protective carrier sheet or backing of material suitable for the purpose in such a manner that when the composite material so formed is wetted and applied, film-foremost, to the glass or similar transparency, the anti-misting film will remain attached thereto whereas the carrier sheet or backing can be peeled off easily.

It will be understood that the film is necessarily pre-coated with adhesive material suited to the particular quality or character of the glass or other rigid transparent sheet so that the anti-misting film will adhere thereto when wetted and applied, and that the medium causing the carrier sheet or backing to adhere to the anti-misting film must be such as will eventually permit the backing to be peeled off, leaving the anti-misting film adhering to the glass or other surface without blemish. Suitable adhesive materials for the purpose of the present invention are those disclosed in the aforesaid British patent specifications because they are absorbent with respect to water and the wetting liquid specified in the aforesaid British patent specifications. However, that adhesive layer which is between the anti-misting film and the backing may advantageously be a somewhat modified form of the above mentioned adhesive material to facilitate the stripping of the backing from the anti-misting film. For example the adhesive material for this layer may be so modified or compounded as to soften more rapidly in the wetting liquid than the adhesive layer which is to lie finally between the anti-misting film and the glass. For example the two layers may be compounded from two different grades of gelatin or other gel-forming material, one being more readily water softenable than the other. If desired, however, the same grade of gelatin or gel-forming material may be employed in compounding both layers, the differential softening properties being ensured by changes in the concentration of other ingredients and/or the presence of additional materials. For example:

*Slow softening layer*

| | | |
|---|---|---|
| Gelatin | gm | 100 |
| Salicylic acid | gm | 25 |
| Water | cc | 500 |
| Sodium tauroglycocholate | gm | 5 to 30 |
| Industrial methylated (64 O. P.) spirit | cc | 5,000 |

*Relatively quick softening layer*

| | | |
|---|---|---|
| Gelatin | gm | 100 |
| Salicylic acid | gm | 25 |
| Water | cc | 500 |
| Sodium tauroglycocholate | gm | 75 to 100 |
| Industrial methylated (64 O. P.) spirit | cc | 5,000 |
| Ethylene glycol | cc | 10 to 20 |
| Glycerine | cc | 0 to 10 |

Alternatively to the use of a second adhesive layer more rapidly softened than the first, a layer of a waterproof, or substantially waterproof, varnish or lacquer may be used for joining the surfaces of the anti-misting film and the backing. When a composite material so made is wetted in water or aqueous media the whole of the surface of the anti-misting film in contact with the varnish or lacquer becomes wetted by virtue of the penetration of the wetting liquid through the said film from the opposite surface thereby breaking down the adhesion between the varnish or lacquer and the anti-misting film, so that the backing material together with the varnish or lacquer layer can be stripped off. The material known under the trade-mark "Formvar" may be mentioned by way of example as being a suitable varnish or lacquer for this purpose.

The backing material may itself be water absorbent or water penetrable or it may be naturally non-absorbent or non-penetrable or be rendered non-penetrable to water or wetting liquid, because in any event the aqueous wetting liquid will loosen the adhesion between the anti-misting film and its backing by virtue of penetration through the film.

The backing, which may also be termed the transfer sheet, serves the purpose of a positively fixed interleaving material for packing and storage purposes and of a stiffener to facilitate handling, marking to shape, and cutting to shape, e. g. the composite material may be held firmly in the hand and be cut easily with scissors or shears.

The backing or transfer sheet may also have printed thereon instructions for applying the material to glass and the like, this constituting a distinct advantage over a separate instructional leaflet which might easily be mislaid. Moreover the printing may be so arranged that quite small areas of the composite material carry a full set of instructions. A transparent backing material e. g. a comparatively thick sheet of regenerated cellulose has the additional advantage that printed or dyed instructions can be clearly read during application of the material by reason of light transmission through the material, while this also permits the user to know when the material is being properly applied e. g. that all air bubbles between the material and the glass have been pressed out.

Moreover the composite material may be loosely rolled up and inserted into a household vessel wherein it may be wetted with water or a wetting solution so avoiding the necessity for a special flat dish or pan.

This composite material when wetted is easily handled in view of the stiffening effect of the transfer sheet, which prevents creasing and folding and facilitates handling out of doors or under draughty conditions, and it can then be applied to a window or other surface without the necessity for special skill or practice. The wetted material, after being applied to the window, can then be smoothed out with a cloth or the like by rubbing and pressing upon the transfer sheet without damage to the anti-misting film which is protected by the transfer sheet. When the whole is satisfactorily smoothed out the transfer sheet is removed by lifting a corner or edge and peeling it off.

What we claim is:

1. As an article of manufacture, a multiple-layer composite flexible sheet material for adhesively applying a thin flexible transparent anti-misting sheet to transparent glass and glass substitutes and to mirrors and reflectors, said multiple-layer material comprising a thin flexible transparent sheet of water-absorbent cellulosic material, a flexible layer of dry transparent adhesive activated by water and carried by one surface of said cellulosic sheet, a second flexible layer of dry adhesive carried by the other surface of said cellulosic sheet, and a flexible sheet of protective or backing material adhesively carried by said second layer, the adherent qualities of the said two layers of adhesive being so graded that when the article as a whole is wetted and promptly applied to the said glass or reflector by smoothing out thereon with the first mentioned adhesive layer in contact therewith the protective sheet can be removed by stripping without detriment to the physical character of the water absorbent cellulosic sheet in its attachment to said glass or reflector whereby the latter is rendered anti-misting.

2. A composite sheet material according to claim 1, both of the layers of dry adhesive material being of predominantly gelatin composition.

3. A composite sheet material as claimed in claim 1, in which the two adhesive layers comprise grades of gelatin differing in their response to softening by water.

4. A composite sheet material as claimed in claim 1, in which the two adhesive layers are compounded from gelatin of the same grade, with which has been incorporated a substance producing adhesive compositions differing in response to water.

5. A composite sheet material as claimed in claim 1, in which the second adhesive layer is a varnish.

6. A composite sheet material according to claim 1, in which the protective sheet is water-absorbent.

7. A composite sheet material according to claim 1, in which the protective sheet is non-penetrable by water.

8. A composite sheet material according to claim 1, in which the protective sheet is transparent.

9. A composite sheet material according to claim 1, in which the protective sheet is a sheet of viscose.

ARCHIBALD ST. JOHN AUSTIN.
REUBEN HILLEL SAPIRO.
REGINALD PERCY FRASER.

(References on following page)

REFERENCES CITED

The following references are of record in the file of this patent:

UNITED STATES PATENTS

| Number | Name | Date |
|---|---|---|
| 1,678,341 | Kaber | July 24, 1928 |
| 1,736,597 | Higginson | Nov. 19, 1929 |
| 2,020,717 | Ansell | Nov. 12, 1935 |
| 2,058,703 | Malivert | Oct. 27, 1936 |
| 2,238,073 | Patten | Apr. 15, 1941 |
| 2,256,108 | Blake | Sept. 16, 1941 |
| 2,353,717 | Francis | July 18, 1944 |

FOREIGN PATENTS

| Number | Country | Date |
|---|---|---|
| 859,757 | France | Sept. 16, 1940 |